(12) United States Patent
Belman

(10) Patent No.: US 10,370,050 B2
(45) Date of Patent: Aug. 6, 2019

(54) ASSEMBLY FOR GIVING SELF-SERVICE ACCESS TO AT LEAST ONE WHEELCHAIR FOR A PERSON OF REDUCED MOBILITY

(71) Applicant: MYD"L", St. Denis (FR)

(72) Inventor: Pierre Belman, Paris (FR)

(73) Assignee: MYD"L", Saint Denis (FR)

( * ) Notice: Subject to any disclaimer, the term of this patent is extended or adjusted under 35 U.S.C. 154(b) by 0 days.

(21) Appl. No.: 15/123,697

(22) PCT Filed: Mar. 2, 2015

(86) PCT No.: PCT/FR2015/050501
§ 371 (c)(1),
(2) Date: Sep. 6, 2016

(87) PCT Pub. No.: WO2015/132517
PCT Pub. Date: Sep. 11, 2015

(65) Prior Publication Data
US 2017/0015376 A1    Jan. 19, 2017

(30) Foreign Application Priority Data

Mar. 6, 2014    (FR) ..................... 14 51842

(51) Int. Cl.
*B62H 3/00*    (2006.01)
*A61G 5/02*    (2006.01)
(Continued)

(52) U.S. Cl.
CPC ............... *B62H 3/00* (2013.01); *A61G 5/028* (2013.01); *A61G 5/04* (2013.01); *A61G 5/12* (2013.01);
(Continued)

(58) Field of Classification Search
CPC ............ G07F 17/0057; G07F 17/0042; G06Q 30/0645; B62H 2003/005; B62H 3/00;
(Continued)

(56) References Cited

U.S. PATENT DOCUMENTS 4,265,478 A * 5/1981 Korsgaard ........... A61G 3/0808
105/159
4,325,576 A * 4/1982 Guthrie ................ A61G 3/0808
280/250.1

(Continued)

FOREIGN PATENT DOCUMENTS

CA        2 445 541        4/2005
DE    20 2013 003821      6/2013
(Continued)

OTHER PUBLICATIONS

International Search Report for PCT/FR2015/050501 dated Apr. 30, 2015, 3 pages.

*Primary Examiner* — Stanton L Krycinski
(74) *Attorney, Agent, or Firm* — Dority & Manning, P.A.

(57) ABSTRACT

Assembly for giving access to at least one wheelchair (1) comprising a frame (2) supported by wheels (5, 7) and provided with a seat (3), the assembly comprising a docking station (100) having a structure (201) delimiting at least one docking point designed to receive the chair such that, when the chair is in the docking point, the chair rests on its wheels and the seat of the chair is disposed so as to be usable by a user who wishes to sit down.

17 Claims, 4 Drawing Sheets

(51) Int. Cl.
*A61G 5/04* (2013.01)
*A61G 5/12* (2006.01)
*B62H 5/00* (2006.01)
*G07F 17/00* (2006.01)
*G06Q 30/06* (2012.01)

(52) U.S. Cl.
CPC .............. *A61G 5/122* (2016.11); *A61G 5/125* (2016.11); *A61G 5/128* (2016.11); *B62H 5/00* (2013.01); *G07F 17/0042* (2013.01); *G07F 17/0057* (2013.01); *B62H 2003/005* (2013.01); *G06Q 30/0645* (2013.01)

(58) Field of Classification Search
CPC .......... B62H 5/00; A61G 5/122; A61G 5/125; A61G 5/128; A61G 5/04; A61G 5/12
See application file for complete search history.

(56) References Cited

U.S. PATENT DOCUMENTS

| | | | | |
|---|---|---|---|---|
| 5,344,265 | A * | 9/1994 | Ullman | A61G 3/0808 410/3 |
| 5,456,518 | A | 10/1995 | Kemppainen et al. | |
| 5,917,407 | A * | 6/1999 | Squire | B62H 3/00 194/205 |
| 6,059,361 | A | 5/2000 | Stachlin et al. | |
| 6,113,325 | A * | 9/2000 | Craft | A61G 3/0808 296/65.04 |
| 6,474,916 | B2 * | 11/2002 | Constantin | A61G 3/0808 410/4 |
| 6,685,403 | B2 * | 2/2004 | Constantin | A61G 3/0808 410/4 |
| 6,776,564 | B1 * | 8/2004 | Kiernan | A61G 3/0808 410/12 |
| 7,073,858 | B2 | 7/2006 | Fisher et al. | |
| 7,425,110 | B2 * | 9/2008 | Ditch | A61G 3/0808 410/19 |
| 7,455,490 | B1 * | 11/2008 | Goosen | A61G 3/0808 410/7 |
| 7,854,576 | B2 * | 12/2010 | Girardin | A61G 3/0808 410/19 |
| 8,650,735 | B2 * | 2/2014 | Johnson | A61G 3/0808 280/304.1 |
| 9,107,786 | B2 * | 8/2015 | Girardin | A61G 3/0808 |
| 2006/0159542 | A1 * | 7/2006 | Ditch | A61G 3/0808 410/7 |
| 2008/0079252 | A1 * | 4/2008 | Shutter | A61G 3/0808 280/755 |
| 2010/0301574 | A1 * | 12/2010 | Derks | A61G 5/08 280/47.4 |
| 2013/0280002 | A1 * | 10/2013 | Girardin | A61G 3/0808 410/7 |

FOREIGN PATENT DOCUMENTS

| | | | |
|---|---|---|---|
| WO | WO 2007/060503 | 5/2007 | |
| WO | WO 2008/040948 | 4/2008 | |
| WO | WO-2011136702 A1 * | 11/2011 | ............... B62H 3/04 |

* cited by examiner

ASSEMBLY FOR GIVING SELF-SERVICE ACCESS TO AT LEAST ONE WHEELCHAIR FOR A PERSON OF REDUCED MOBILITY

CROSS REFERENCE TO RELATED APPLICATION

This application is the national stage entry of International Patent Application No. PCT/FR2015/050501 having a filing date of Mar. 2, 2015, which claims priority to and the benefit of French Patent No. 1451842 filed in the French Intellectual Property Office on Mar. 6, 2014, the entire contents of which are incorporated herein by reference.

The present invention relates to the provision of assistance to individuals of reduced mobility. It notably targets an assembly for providing self-service access to at least one wheelchair for a person with reduced mobility.

A person with reduced mobility is to be understood to mean any individual incapable of walking or at the very least having a very short range for moving around on foot. Certain elderly people, individuals suffering from a motor handicap, heart problems or respiratory difficulties are, for example, considered to fall into the "reduced mobility" category.

The use of wheelchairs outside of a hospital environment is generally reserved for individuals suffering from a serious motor handicap of the lower limbs that justifies the possession of their own personal wheelchair.

An increasing number of individuals experience difficulties in moving around without, however, having a permanent need for a wheelchair. Such is notably the case of the elderly who tire more rapidly and sometimes abandon the idea of moving around. Existing wheelchairs are bulky, complicated to move around, and expensive both for the user and for the health care organizations.

The Applicant has identified a need to make it easier for individuals with reduced mobility to move around.

To that end, the Applicant is proposing an assembly for providing self-service access to at least one wheelchair comprising a chassis supported by wheels and provided with a seating member. The assembly comprises a docking station comprising a structure delimiting at least one docking point to accept the wheelchair in such a way, that, when the wheelchair is in the docking point, the wheelchair rests on its wheels and the seating member of the wheelchair is arranged in such a way as to be usable by a user wishing to sit down.

Thus, the assembly providing self-service availability makes it possible to offer individuals with reduced mobility the possibility of taking a rest in the wheelchair housed at the docking station, as on a public bench, and possibly of using the wheelchair to move around. The assembly therefore performs a dual function: It makes it easier for weak individuals to move around and acts as a fixed bench for everybody.

Advantageously, the structure comprises a substantially vertical wall delimiting part of the docking point facing a frontal opening and a fold-down seating member mounted to said wall so as to be mobile between a position of use when the docking point is empty and a retracted position when the wheelchair is accepted in the docking point.

The docking station may then act as a fixed support for sitting down, even in the absence of a wheelchair. Such a docking station may replace conventional street furniture by continuing to perform the function of a bench even when the wheelchairs are absent.

According to one embodiment, the docking station is provided with means of retaining the wheelchair in the docking point. The retaining means are preferably designed to be controlled by an electronic device associated with the docking station.

The electronic device is designed, for example, to perform a method of managing the wheelchairs so that wheelchairs can be loaned or hired.

For better integration of the self-service availability assembly into its environment, the structure of the docking station comprises lateral walls designed to extend facing the wheels of the wheelchair when the wheelchair is in the docking point.

Viewed from the outside, the less attractive and delicate parts of the wheelchair, namely its wheels, are thus hidden from view to passers-by and are protected from the wind and from splashes.

According to another aspect, the invention targets an assembly comprising:
  the docking station delimiting the docking point,
  at least one wheelchair comprising a chassis supported by wheels, provided with a seating member and arranged so that when the wheelchair is in the docking point of the docking station, the wheelchair rests on its wheels and the seating member of the wheelchair can be used by a user wishing to sit down, and
  a locking system for locking the wheelchair in the docking point of the docking station.

It is therefore possible to make a distinction between two groups of users. The first group, consisting of all users, can use the wheelchairs as a support for sitting down when the seats are locked to the docking station. The docking station immobilized, for example anchored into the ground, and the user being unable to detach the wheelchair, risks of theft or vandalism are reduced. This is all the more important when the assembly is installed in the public domain, for example near a thoroughfare. The second group, consisting of pre-selected users to whom unlocking means have been issued may, furthermore, extract the wheelchairs from the docking station. The unlocking means may adopt various forms, such as a mechanical key, an electronic key or badge, a code, a lock operated against a deposit, or a combination of these means. The individuals from the second group can use the wheelchair as they wish for moving around near the docking station or from one docking station to another.

The locking system may comprise a latch and a strike which are designed to engage with one another, one being mounted on the docking station and the other on the wheelchair or vice versa. In other words, a latch is mounted on the docking station and a strike is secured to the wheelchair, or alternatively, a latch is mounted on the wheelchair and a strike is secured to the docking station.

The docking station and the wheelchair each therefore includes one member of the latch/strike pair. Here, the word latch denotes the moving part and the word strike denotes the fixed part.

Supplying power to the docking station, for example by connecting it to the mains or by using a system of solar panels, is an easy matter. Supplying the wheelchair with power entails the use of a battery and means for recharging same. The strike may have no means of electrical power whereas it is preferable for the latch to be powered, notably when it is fully motorized, or even controlled electronically and operated by the user. Therefore, it is easier and less expensive to mount the latch on the docking station and the strike on the wheelchair than it is to do the reverse.

At least one seat provided with a seating member may be fixed to the structure of the docking station, the latch or the strike being housed under the seating member of the seat of the docking station. Such a seat is then designed to not be detachable from the rest of the docking station, as opposed to the wheelchair. When the wheelchair is absent from its housing, the seat can still be used by all for sitting down in situ. When a wheelchair is brought into a housing of the docking station, the seat then acts as a support for attaching the wheelchair. The latch or the strike, under the seating member of the seat, is invisible to the users. In the absence of a wheelchair, they can sit down on the seat without risk or impediment.

The latch may have a housing able to accept the strike, the latch being fitted with a lock bolt able to move between a position of engagement in which said lock bolt projects into the housing, retaining the strike therein, and a retracted position in which introduction of the strike and extraction of the strike from the housing are permitted. Such a configuration is particularly compact and inaccessible to a user sitting down normally, thereby further reducing the risk to a user sitting down on the seat of being impeded or of accidentally snagging their clothing.

The latch may be provided with a cam surface arranged in such a way that pressure of the strike against the cam surface causes the lock bolt to move from one of its positions to the other. When the wheelchair is inserted into a docking point of the docking station, the lock bolt positions itself in the closed position to lock the wheelchair to the docking station. The user is spared the need to perform a specific locking action. Locking occurs in the continuation of the motion of inserting the wheelchair into the docking point. Putting the wheelchair away is easy, particularly for an individual with reduced mobility.

The strike may take the form of a bar. Such a bar may form part of a framework of the wheelchair or of the docking station. This avoids the addition of a specific component to form the strike at the time of manufacture.

The strike may take the form of an elongate plate having a free end pierced with an opening. Depending on the shape and size of the cutout, the strike may be rendered suitable for a great many latches. For example, a wheelchair provided with such a strike may fit and lock to docking stations of different types.

The strike and the latch may each have an active part, the active part of the strike extending over a height greater than the height over which the active part of the latch extends so as to allow a clearance range for the relative vertical positioning of the docking station and the wheelchair during the operations of inserting/extracting the wheelchair. Thus, wheelchairs of different types may lock to one and the same docking point of a docking station and vice versa. It is also possible to offer wheelchairs designed more specifically for certain individuals or certain disabilities. When the docking stations are anchored into the ground, the installers enjoy a greater degree of tolerance as to the depth of anchorage. A docking station offering a range of latches or strikes may be installed so that the row is not strictly parallel to the ground. This also makes it possible to reduce the preparation work needed in the immediate vicinity of the docking station.

Although the wheelchairs and the docking stations are designed to cooperate with one another, they may be manufactured, supplied, maintained and/or used independently of one another. The invention simultaneously targets an assembly comprising a docking station without wheelchairs, an assembly comprising both a docking station and at least one wheelchair, and even a wheelchair able to cooperate with such assemblies.

Such a wheelchair may be defined as a wheelchair comprising a chassis supported by wheels and provided with a seating member, said wheelchair being arranged so that, when the wheelchair is in a docking point of a docking station the wheelchair rests on the ground via its wheels and the seating member of the wheelchair can be used by a user wishing to sit down.

When the docking station is provided with fixed or fold-down seats, the wheelchairs advantageously have a configuration such that an empty space is left under the seating member and between the wheels. Thus, when the wheelchair is inserted into the docking point of the docking station, the seating member of the seat is inserted into the empty space of the wheelchair, under the seating member of the wheelchair. The wheelchair continues to rest on the ground via its wheels, and the seating member of the wheelchair covers the seating member of the seat. A seating member remains available to a user wishing to sit down, whether this seating member belongs to the seat or to the wheelchair.

Further features and advantages of the invention will become apparent from reading the following description of non-limiting particular embodiments of the invention.

Reference will be made to the attached drawings, among which:

The self-service availability assembly of the first embodiment is described here in a version that makes four wheelchairs available on a self-service basis. Of course, the self-service availability assembly may be designed to make a different number of wheelchairs, and, for example, one, two, three or five wheelchairs, available. This number may be adapted to how heavily frequented the site at which the assembly is to be installed is, or to suit the amount of space available.

Figure 1:
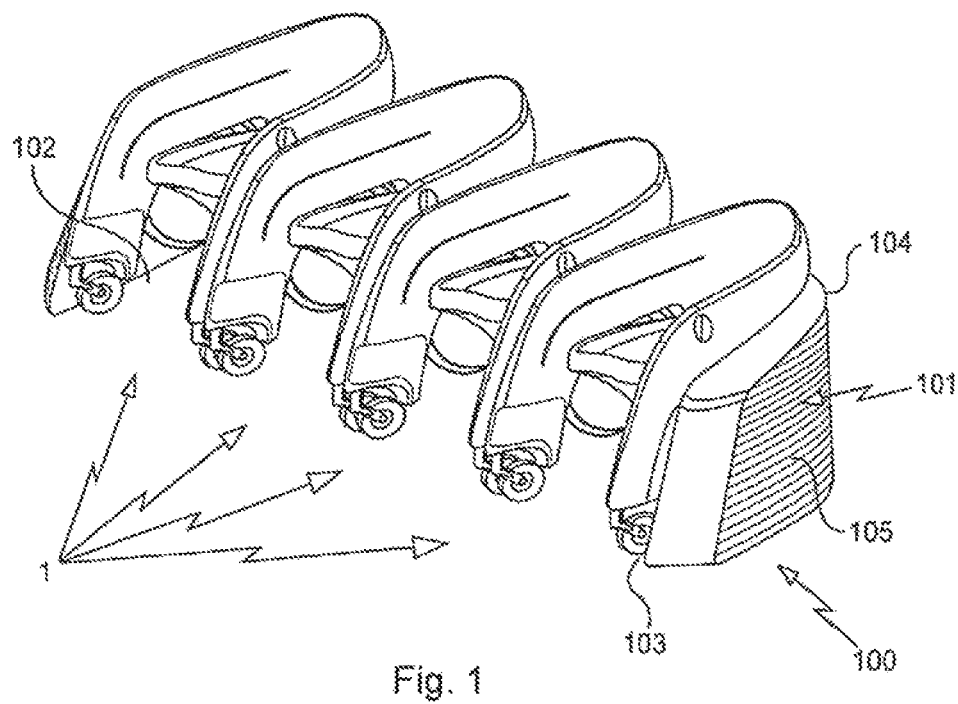
FIG. 1 is a perspective view of an assembly according to a first embodiment of the invention, the station accepting the wheelchairs.
Figure 2:
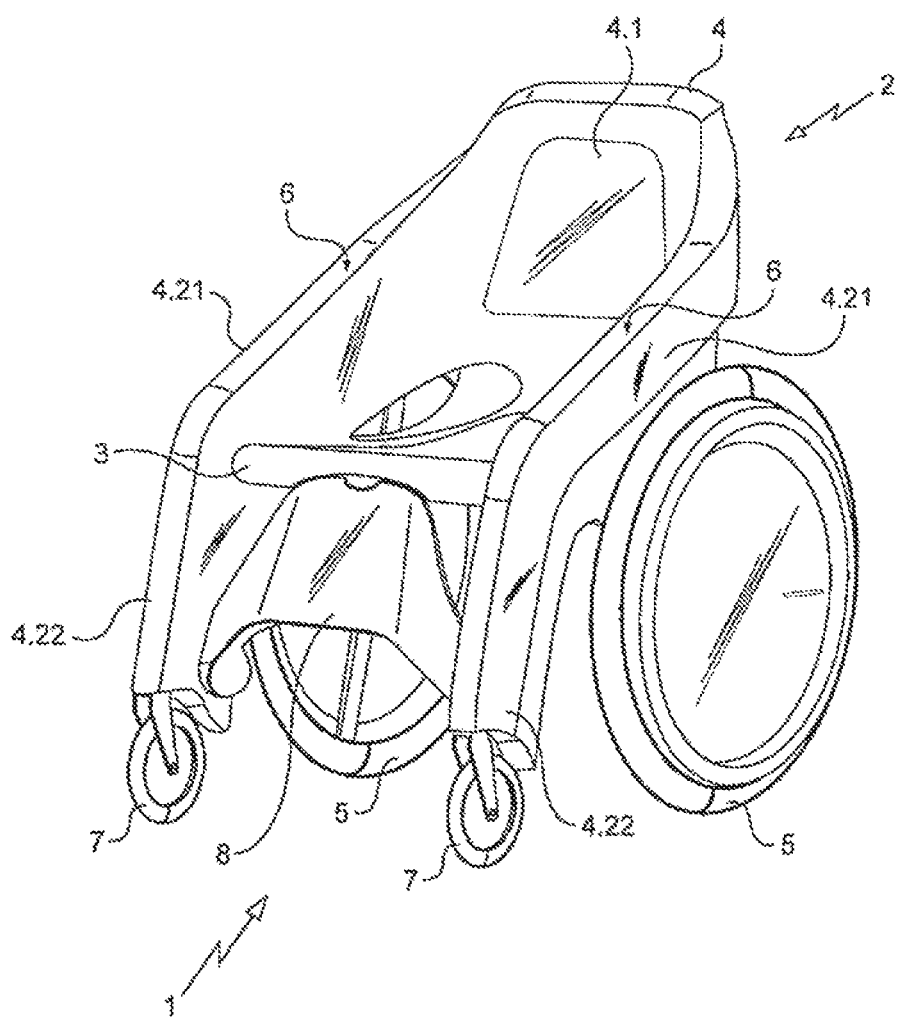
FIG. 2 is a perspective view of a wheelchair according to the invention.
Figure 3:
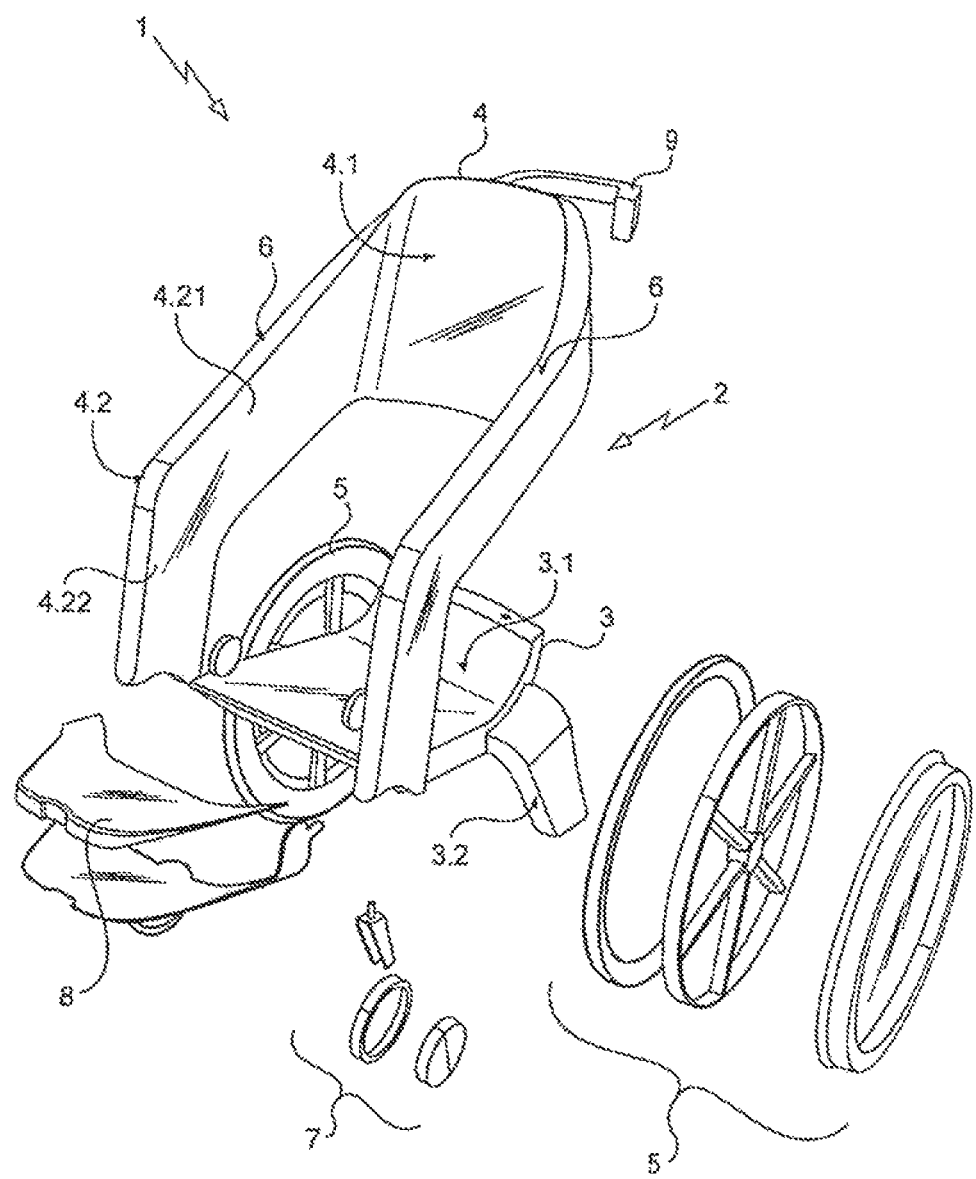
FIG. 3 is a perspective and exploded view of this wheelchair.

With reference to FIGS. 1 to 3, the self-service availability assembly comprises wheelchairs and a docking station referenced 1 and 100 respectively.

Each wheelchair 1 comprises a chassis 2. The chassis 2 here comprises a shell made from a plastic, possibly a fiber-reinforced plastic. The shell comprises two components 3, 4, fixed together by bolting.

The first component 3 comprises a substantially horizontal wall forming a seating member 3.1 of the wheelchair and two lateral members 3.2 extending downward from the seating member 3.1. The free end of each lateral member 3.2 is fitted with a large wheel 5.

The second component 4 comprises a substantially vertical wall forming a backrest 4.1 on each side of which there extends an arm 4.2. Each arm 4.2 thus comprises a portion 4.21, near to the backrest 4.1, which has an upper surface that is inclined to form an armrest 6 and a substantially vertical portion 4.22, having a lower end provided with a steering wheel 7. The two portions 4.21 and 4.22 of an arm are joined together by a bend. The component 4 is designed to fit onto the component 3 over at least part of the periphery of the seating member 3.1. The portions 4.21 are smaller in height than the backrest 4.1. The component 4 is, for example, formed from a rigid hollow envelope made of rotomolded plastic.

The seating member 3.1 and the backrest 4.1 at least may be provided with a covering softer than the envelope in order to offer the user greater comfort. The soft covering for example comprises a layer of elastically deformable plastic, for example a cellular elastomer with an external surface that forms a skin, or a cushion comprising a textile envelope containing a synthetic padding. In this instance, the soft covering is removable so that it can be cleaned or replaced.

The seating member 3.1 is, in this instance, pierced with at least one opening to make it easier for rain water to escape.

The large wheels 5 are connected to the members 3.2 and mounted with the freedom to pivot about a substantially horizontal axis. The spacing of the wheels 5 is greater than the width of the component 4 so that the peripheral part of each wheel 5 lies in the immediate vicinity of one of the armrests 6. The wheels 5 are mounted in such a way that they do not extend height-wise beyond said armrests 6. Each wheel 5 is fitted with a tire (solid or inflatable) and with a trim, for example made of plastic. The wheel 5 may, furthermore, be provided with an annular peripheral grip allowing the user to propel the wheel chair by hand without coming into contact with the tire which may be dirty. As an alternative, the armrests 6 extend partially over the wheels 5 in order to act as mudguards.

A footrest 8 is mounted between the portions 4.22 of the arms 4.2 so as to be mobile between a substantially horizontally deployed position and a substantially vertical storage position. The footrest 8 here comprises an upper part made of plastic which is fixed to a sheet metal support itself articulated to the portions 4.22.

A handle 9 is fixed horizontally to the rear of the backrest 4.1 to assist an individual in pushing and maneuvering the wheelchair 1.

The docking station 100 comprises a structure 101 delimiting a docking point 102 and a frontal opening 103 allowing the wheelchairs 1 to be introduced into the docking point 102. The docking station 100 is arranged so that when a wheelchair 1 is in its docking point 102, the wheelchair 1 rests on its wheels 5, 7, and the seating member 3.1 extends facing the frontal opening 103 so that it can be used by a user wishing to sit down. The docking station 100 may thus be used both as a public bench and as a means for making a wheelchair available. The docking station 100 comprises means of fixing it to the ground.

In the example described here, the structure 101 has, when viewed from above, the shape of a squashed U with a bottom wall 104 and two lateral walls 105. The structure 101 is preferably hollow and self supporting, for example made of a rotomolded plastic. The docking point 102 is formed between the lateral walls 105 which also delimit the frontal opening 103. The width of the frontal opening 103 corresponds to the spacing of the lateral walls 105. The lateral walls 105 are designed to hide and/or protect the wheels 5, 7 of the wheelchairs 1 when these wheelchairs are in the docking point 102.

The structure 101 is provided with means for retaining wheelchairs 1 in the docking point 102. Here, the assembly comprises systems for locking the wheelchairs 1 in the docking point 102.

Each locking system comprises, for example, a bar secured to a wheelchair 1, a housing to receive the bar formed in the structure 101 and a lock bolt mounted with the ability to move between a position projecting into the housing in order to retain the bar therein and a retracted position allowing the bar to be introduced into the housing and allowing the bar to be extracted from the housing. Here, an elastic member, for example a spring, urges the lock bolt into the projecting position. In such an example, the bar forms a strike. The housing and the lock bolt form a latch. The latch and the strike form a locking system.

Actuators are provided for bringing the lock bolt from its projecting position into its retracted position, against the force exerted by the elastic member. These actuators may, for example, adopt the following configurations:
- a cam surface formed on the lock bolt of the latch so that contact of the bar with said cam surface causes the lock bolt to move into its retracted position;
- an operating rod that can be operated by a user and that is connected to the latch such that movement of the rod causes the lock bolt to move.

In an alternative form, an electric actuator is mounted in the vicinity of the latch and is connected to the lock bolt in order to move same into its retracted position.

In the example described here, the actuator is connected to an electronic device and to a source of electrical energy both of which are associated with the docking station 100. The electronic device here comprises a computer unit (notably incorporating a computer or processor and a memory) that is programmed to run a wheelchair management program to allow the wheelchairs 1 to be hired. Such a management program makes it possible, for example, to measure the time of hire, make a reservation over the internet, invoice a service. The management program may also be designed to allow wheelchairs to be loaned for a predetermined duration.

The electronic device comprises a terminal with a man/machine interface that allows the user to register and record the payment of a deposit, for example using a bank card.

As an alternative, the actuator may be operated by a wireless connection by means of an electronic badge (comprising for example an RFID chip) issued to the user once he has registered his personal data and paid the deposit.

The actuator is then connected to an RFID chip reader, itself connected to the electronic device. The electronic device operates the actuator when the RFID chip of the electronic badge issued to the user is detected.

The electronic badge issued to the user may be dedicated to a determined docking station or to a determined group of docking stations so that it commands the release of a wheelchair only in the determined docking station or in one of the docking stations of the determined group.

The wheelchair itself is equipped with an RFID badge allowing it to be identified to facilitate wheelchair management and possibly register incidents that have occurred in the use of the wheelchairs. Such incidents are, for example, flagged on the terminal of the electronic device and recorded in its memory in relation to an identifier of the wheelchair and time- and date data regarding the wheelchair hire period.

The docking stations of one and the same group are, in this instance, interconnected by a bus connection of RS-485 type. One of the stations performs the functions of wheelchair management for the entire group. The memory at this station is designed to store the list of loans performed, loans reserved, and usage statistics (time- and date data, duration) and incidents.

As an alternative, the docking station 100 comprises a roof surmounting the structure in order to protect the wheelchairs 1 from rain and sun. The covering that covers the seating member and the backrest of the wheelchairs 1 is based on a material that does not absorb water, that dries quickly, and that warms up to a limited extent under the effect of solar radiation.

In an alternative form of the docking station, intermediary walls extend from the bottom wall 104 to form docking points 102 which are separated from one another. The structure 101 then has, when viewed from above, the shape of a comb with widely-spaced teeth, each docking point 102 having a frontal opening 103.

The wall 104 of the structure 101 comprises a substantially vertical portion delimiting part of each docking point 102 facing the frontal opening 103. A fold-down seating member is mounted on said wall portion. It is able to move between a horizontal position of use, when the docking point has no wheelchair and a vertical retracted position when a wheelchair is accommodated in the docking point.

Said wall portion thus forms a backrest for an individual installed on the deployed seating member, whereas the upper surface of the lateral walls 105 and the upper surface of the intermediary walls form armrests. The seating member of the intermediary walls form a seat.

The term "seat" used here is used to identify the part fixed to the structure 201 of the docking station 100 as opposed to the term "wheelchair" which denotes specifically the part intended to detach from the docking station 100.

Figure 4:
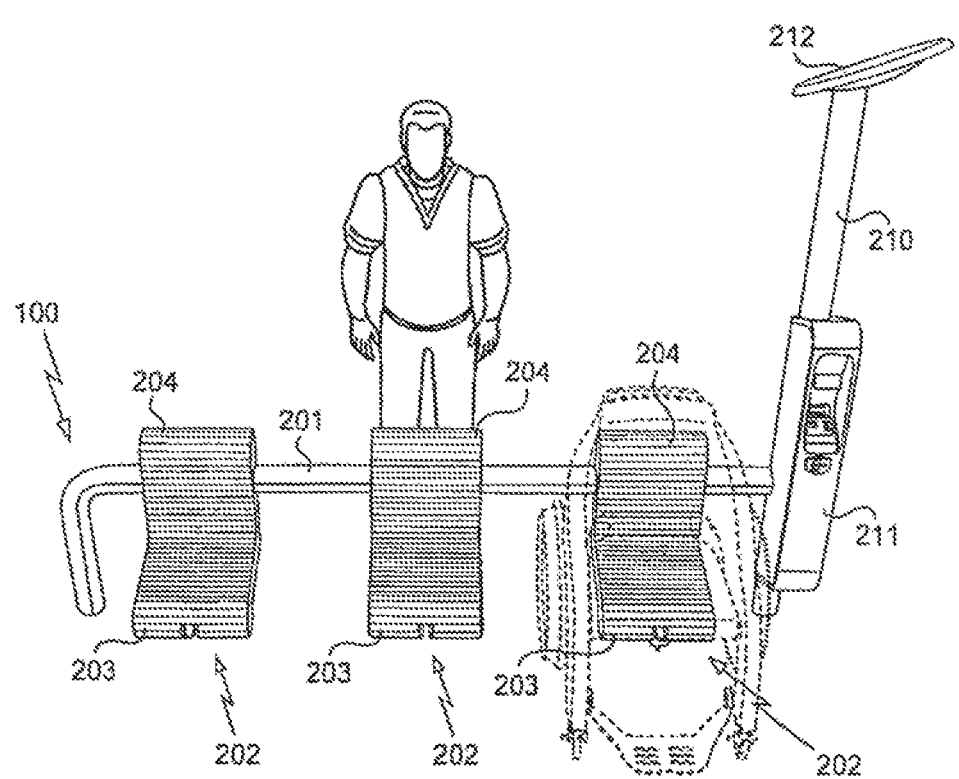
FIG. 4 is a perspective view of an assembly according to a second embodiment of the invention.
Figure 5:
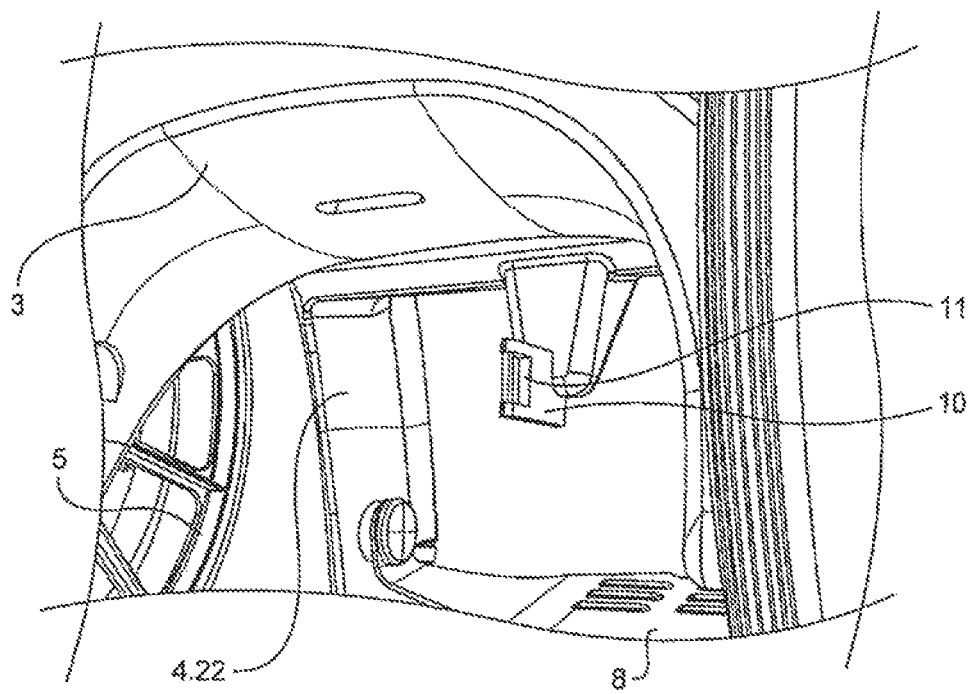
FIG. 5 is a partial perspective view of a wheelchair suited to this assembly.
Figure 6:
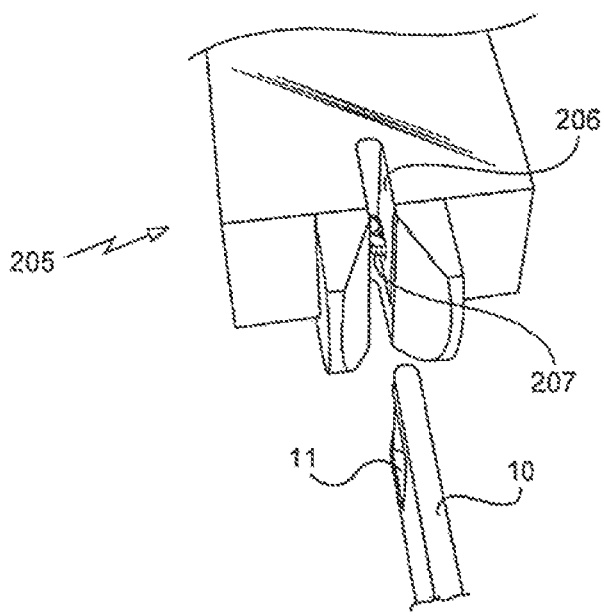
FIG. 6 is a partial perspective view of a device for attaching a wheelchair to a station.

Reference is now made to the second embodiment depicted in FIGS. 4 to 6. Elements identical or similar to those previously described bear the same numerical reference.

The docking station 100 comprises a structure 201, forming the base of a public bench, and individual seats 202 which are spaced apart. Each seat 202 comprises a seating member 203 and a backrest 204. Each seat 202 also forms a docking point for a wheelchair 1. The front edge of the seating member 203 is cut with a vertical cut.

Each seat 202 is provided with a locking device 205, or latch. Each latch is, in this instance, electrical. Each latch comprises a casing delimiting a housing in the form of a slot 206 in which a lock bolt 207 is able to move between a position projecting into the slot 206 and a position retracted from the slot. The casing is fixed under the seating member 203 in such a way that the slot 206 extends behind the cut formed in the front edge of the seating member 203, in the continuation of said cut. The casing contains a spring urging the lock bolt 207 toward its projecting position and an actuator, in this instance an electrical actuator, designed to move the lock bolt 207 from its projecting position into its retracted position.

The wheelchair 1 of the assembly according to the second embodiment is, in this instance, similar to the one described previously.

It comprises a strike 10 in the form of an elongate plate having a free end pierced with an opening 11 and the opposite end fixed under the seating member 3.1 near a front edge thereof. The plate that forms the strike 10 extends toward the rear of the wheelchair 1 and in a vertical plane.

When the wheelchair 1 is resting normally on the ground, the underside of the seating member 3.1 of the wheelchair 1 extends at a height higher than the upper surface of the seating member 203. The wheels 5 are separated by a distance greater than the width of the seating member 203. The wheelchair is thus designed to be engaged, by reversing it in, over the top of the seating member 203 of one of the seats 202 while resting on these wheels, the wheels 5 engaging on each side of the seating member 203.

The strike 10 is designed and positioned such that when the wheelchair is thus engaged over the top of the seating member 203 of a seat 202, the strike 10 is introduced into the cut in the front edge of the seating member 203 and into the slot 206. The lock bolt 207 has a cam surface oriented toward the cut in the front edge of the seating member 203 so that the free end of the strike 10 can press against the cam surface and retract the lock bolt when the strike 10 is introduced into the slot 206. The strike 207 returns to its projecting position under the action of the spring as soon as it finds itself facing the opening 11 in the strike 10, thereby locking the latter.

A post 210 secured to the structure 201 bears an electronic terminal 211 and, at its upper end, a stand 221 provided with a solar panel that powers a battery connected to the electronic terminal 211 and to the stand 212. As an alternative, the electronic terminal 211 is connected to the electrical mains.

The electronic terminal 211 incorporates a control unit connected to the actuators of the locking devices 205 in order to operate said actuators and to a man/machine interface allowing a user to dialog with the control unit with a view to unlocking a wheelchair 1 engaged in the docking station.

The man/machine interface comprises, for example, a screen and a keyboard allowing an identifier and a code to be input. Potential users are, for example, listed in a database that the control unit can interrogate in order to authenticate the user who has input his identifier and his code and determine whether the user is authorized to borrow a wheelchair 1. As an alternative, the terminal comprises an integrated circuit card reader that can read an integrated circuit card that identifies a user or allows him to make payments.

In the absence of a wheelchair 1 in the docking station 100, passers-by can sit down on the seats 202. When a wheelchair is present, passers-by can sit down either in the wheelchair 1 or on a seat 202 that is free.

Of course, the invention is not restricted to the embodiments described but encompasses any alternative form that falls within the scope of the invention as defined by the claims.

In particular, the features described in conjunction with one embodiment can be transcribed, individually or in combination with one another, to the other embodiments.

It is possible for the wheelchair and the station to have a structure that differs from those described. The shell of the wheelchair may be manufactured in a single piece, for example by rotomolding. The wheelchair chassis may, for example, comprise a latticework of metal tubes to which a seating member and a backrest are fixed.

The seating member and the backrest of the wheelchairs may be made from a soft material.

The wheelchairs and the docking station may have mechanical reinforcers.

The docking station may comprise one or more docking points to accept several wheelchairs and/or one or more individual docking points.

The docking station may be designed so that the wheelchair can be introduced into the docking point and/or extracted from the docking point via a rear opening of the docking point. The docking station may be designed so that the wheelchair is introduced into the docking point from the rear of the docking station and extracted therefrom from the front.

In order to limit the depth-wise size of the docking station, notably according to the first embodiment, it is possible to provide vertical cuts in the end wall so as to accommodate the rear part of the wheels of the wheelchairs accommodated in the docking points.

The docking station may be equipped with a fold-down cover aimed at preventing the wheelchairs from being extracted and/or protecting them from the weather.

The control device may be controlled by a coin meter.

The retaining means may comprise:

a locking device secured to the structure of the station or of the wheelchair and provided with a casing with a lock bolt which is able to move between a projecting position and a position retracted from the slot, a strike secured to the wheelchair or to the structure of the station so that it can cooperate with the lock bolt when the wheelchair is in position in the docking station.

The locking system may be essentially mechanical, a key, for example, allowing the lock bolt to be moved between its two positions.

The invention claimed is:

1. An assembly for providing self-service access to at least one wheelchair comprising a chassis supported by wheels and provided with a seating member, the assembly comprising a docking station comprising a structure delimiting at least one docking point to accept the wheelchair in such a way, that, when the wheelchair is in the docking point, the wheelchair rests on the wheels and the seating member of the wheelchair is arranged in such a way as to be usable by a user wishing to sit down;

wherein the wheels include rear wheels;

wherein the structure forms a base having at least one seat having a seating member which is not as high as the seating member of the wheelchair and is not as wide as a space between the rear wheels of the wheelchair such that the wheelchair can be engaged, in reverse, over the top of the seating member of the seat while resting on the wheels;

wherein the docking station is provided with a locking device configured to retain the wheelchair in the docking point; and wherein the locking device is secured to the structure and comprises, a casing delimiting a slot in which a lock bolt is able to move between a position in which the lock bolt projects into the slot and a position retracted from the slot, and a strike secured to the wheelchair configured to be engaged in the slot and to collaborate with the lock bolt when the wheelchair is in a position in the docking station.

2. The assembly as claimed in claim 1, in which the structure comprises a substantially vertical wall delimiting part of the at least one docking point facing a frontal opening and a fold-down seating member mounted to said wall so as to be mobile between a position of use when the docking point is empty and a retracted position when the wheelchair is accepted in the docking point.

3. The assembly as claimed in claim 1, in which the casing contains a spring urging the lock bolt to return toward the position in which it projects into the slot and an electric actuator arranged to move the lock bolt from the position in which it projects into the slot into the position retracted from the slot.

4. The assembly as claimed in claim 1, in which the locking device is arranged to be controlled by an electronic device associated with the docking station.

5. The assembly as claimed in claim 4, in which the electronic device is arranged to perform a method of hiring the wheelchair.

6. The assembly as claimed in claim 1, in which the structure of the docking station comprises lateral walls designed to extend facing the wheels of the wheelchair when the wheelchair is in the at least one docking, point.

7. The assembly as claimed in claim 1, comprising the at least one wheelchair of which the chassis of the wheelchair comprises a shell forming the seating member and a backrest of the wheelchair.

8. The assembly as claimed in claim 7, in which arms extend forward from, the backrest, which are bent downward and which each have a lower end provided with one of the wheels that form steering wheels.

9. The assembly as claimed in claim 8, in which a footrest is fixed between the arms so as to be mobile between a substantially horizontal position of use and a substantially vertical storage position.

10. The assembly as claimed in claim 7, in which the shell comprises at least one component made of rotomolded plastic.

11. The assembly as claimed in claim 1, in which the locking system comprises a latch fitted with the lock bolt.

12. The assembly as claimed in claim 1, the latch being housed under the seating member of the seat of the docking station.

13. The assembly as claimed in claim 11, in which the latch has a housing able to accept the strike, the lock bolt being able to move between a position of engagement in which the lock bolt projects into the housing, retaining the strike therein, and a retracted position in which introduction of the strike and extraction of the strike from the housing are permitted.

14. The assembly as claimed in claim 13, in which the latch is provided with a cam surface arranged in such a way that pressure of the strike against the cam surface causes the lock bolt to move from one of the position of engagement in which the lock bolt projects into the housing and the retracted position.

15. The assembly as claimed in claim 1, in which the strike has the form of a bar.

16. The assembly as claimed in claim 1, in which the strike has the form of an elongate plate having a free end pierced with an opening.

17. The assembly as claimed in claim 11, in which the strike and the latch each have an active part, the active part of the strike extending over a height greater than the height over which the active part of the latch extends so as to allow a clearance range band for the relative vertical positioning of the docking station and the wheelchair during the operations of inserting the wheelchair into the docking station or extracting the wheelchair from the docking station.

* * * * *